United States Patent
Mueller et al.

[11] 3,867,021
[45] Feb. 18, 1975

[54] MOTION PICTURE CAMERA SYSTEM

[75] Inventors: Arthur C. Mueller, Niles; Kenyon A. Hapke, Libertyville, both of Ill.

[73] Assignee: Bell & Howell Company, Chicago, Ill.

[22] Filed: Aug. 24, 1972

[21] Appl. No.: 283,631

[52] U.S. Cl. .............................. 352/72, 352/78 R
[51] Int. Cl. .......................................... G03b 23/02
[58] Field of Search ............... 352/72, 77, 78, 159; 242/75

[56] References Cited
UNITED STATES PATENTS

| | | |
|---|---|---|
| 2,132,714 | 10/1938 | Wittel et al. .......................... 352/77 |
| 3,231,665 | 2/1941 | Fairbanks .......................... 352/78 R |
| 3,584,942 | 6/1971 | Downey .......................... 352/130 X |
| 3,600,071 | 8/1971 | Downey .......................... 352/78 R |
| 3,604,327 | 9/1971 | Hirata .......................... 352/78 R X |
| 3,642,229 | 2/1972 | Downey .......................... 352/72 X |

Primary Examiner—Fred L. Braun
Assistant Examiner—Alan Mathews

[57] ABSTRACT

A motion picture camera which permits film provided in a protective cassette to be driven selectively through a series of operations. An external locking element on the camera is engageable with a film snubber member provided in the cassette to releasably lock the snubber member from rotation within the cassette during the operation of the camera.

11 Claims, 7 Drawing Figures

PATENTED FEB 18 1975  3,867,021

MOTION PICTURE CAMERA SYSTEM

BACKGROUND AND GENERAL DESCRIPTION

This invention generally relates to motion picture camera systems, and more particularly relates to a camera system that retains the film supply within a protective cassette while permitting the film to be selectively driven in forward or reverse to subject the film to a series of different operations.

Motion picture film in the past has been handled in a manner which is cumbersome and time-consuming. The general practice has been to have a roll of film developed by a processing laboratory after the roll has been exposed. The result of this practice is a delay of up to several days before the developed film can be viewed and enjoyed.

As more fully explained in U.S. Pat. No. 3,608,455, issued on Sept. 28, 1971 to Rogers B. Downey, recent technological advances in diffusion transfer techniques make it possible for motion picture film to be processed and projected shortly after the film has been exposed. Systems for accomplishing the rapid exposure, development, and projection of motion picture film recently have been developed. Basically, such systems include a camera designed for exposing the film, a processor which functions to develop the exposed film; and a viewer for showing the developed film. The film used in such a system is retained within a protective container or cassette so that the film will not be damaged during any stage of operation of the system.

In the development of such systems and system components it has been found that the interfaces between the film-storing cassette and the camera and viewer are very important. The cassette must be positioned and retained in both the camera and the viewer in a manner that assures the proper handling of the film. In addition, the interfaces with the cassette must permit the film to be driven either intermittently in a forward direction by the shuttle in either the camera or the projector during exposure or projection of the film, respectively; driven at a substantially constant speed in a reverse direction in the processor/viewer as the exposed film is developed within the cassette; or driven at a substantially constant speed in forward or reverse by the processor/viewer during rewinding or replaying of the film.

The principal purpose of this invention is to provide a camera system having a cassette and a camera interface arrangement which performs the above functions and which further is adapted for use in an integrated system for quickly developing and projecting motion picture film. More specifically, the system of the present invention provides an interface which permits a cassette to be readily inserted and removed from the film chamber of a camera. The system also retains the cassette in a selected position within the film chamber so that the film exposure gate of the cassette is in proper alignment with the lens system of the camera. The cassette/camera interface also includes a rotatable film snubber and cooperating lock means which lock the snubber from rotation when the cassette is positioned within the film chamber of the camera. The locked snubber is thereby conditioned to isolate the film in the cassette film gate from the film take-up drive, so that the film in the gate is substantially motionless as it is exposed. The locked snubber is further designed to control the advance movement of the film in the cassette by the camera film shuttle mechanism. Moreover, the cassette/camera interface in accordance with this invention functions to release the snubber lock when the film cassette is removed from the camera. The film then can be driven readily in either a forward or reverse direction in the cassette during the subsequent developing and projecting operations.

Briefly described, the motion picture camera system embodying the features and advantages of the present invention includes a cooperating camera and film cassette. The cassette houses a supply of motion picture film, and includes a film gate through which the film is exposed, and film take-up means. The camera provided in the system includes an exposure aperture and film chamber for receiving the cassette. Positioning means in the chamber maintain the cassette film gate aligned with the camera exposure aperture. Further, camera shuttle means incrementally moves the film through the gate during the picture-taking operation, and camera drive means advances the exposed film to the take-up means. Rotatable and lockable film snubbing means is mounted on an axis within the cassette between the film gate and the take-up means. The snubber is engageable with the exposed film advancing to the take-up means from the film gate. A locking portion of the snubber is accessible from the exterior of the cassette, and is engageable by locking means provided on the camera. During film transport, the locking means operates to lock the snubbing means within the cassette from rotation, so as to isolate the film at the film gate from the film driving force of the take-up means.

EXEMPLARY EMBODIMENT

Further features and advantages of the present invention will become apparent from the following description of an exemplary embodiment thereof taken in conjunction with the accompanying drawings, in which.

Figure 1:
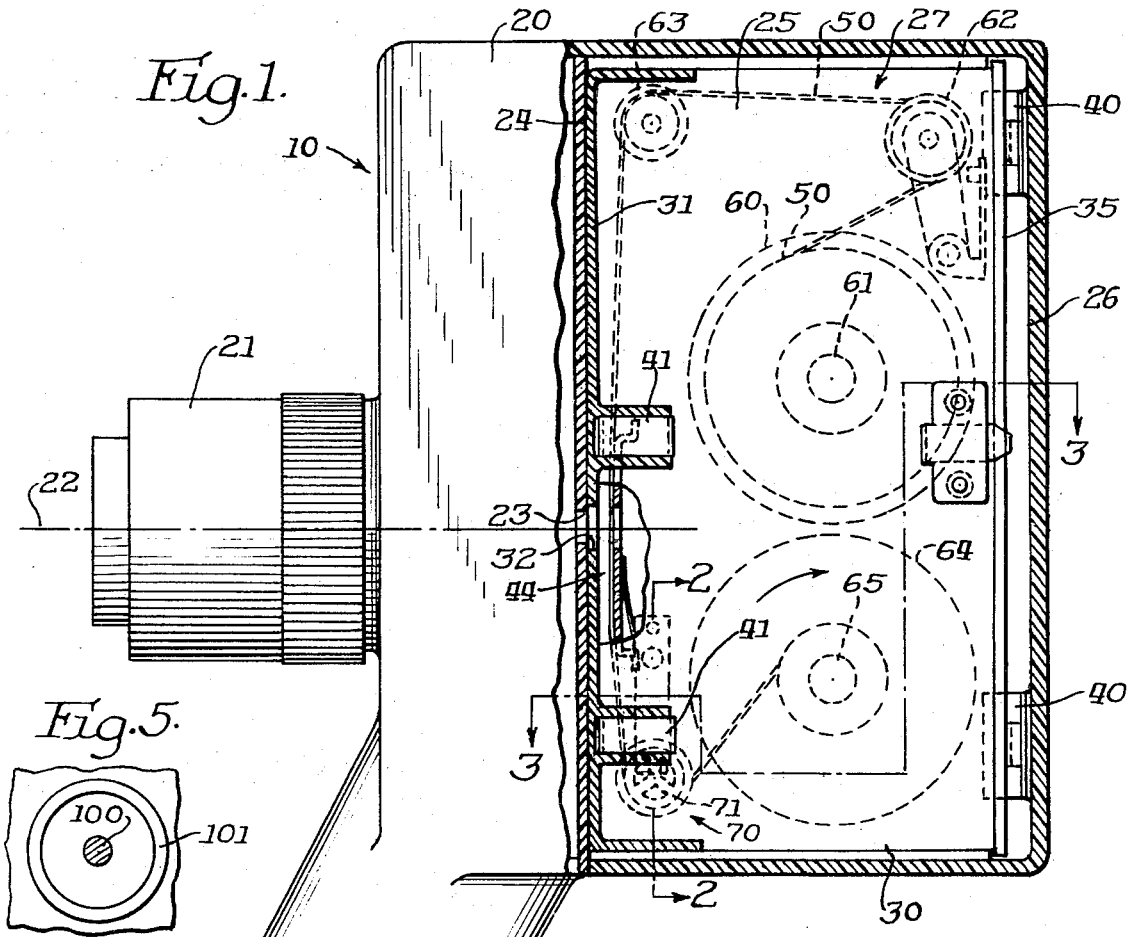
FIG. 1 is a plan view, in partial section, of a motion picture camera system embodying the features and advantages of the present invention.
Figure 3:
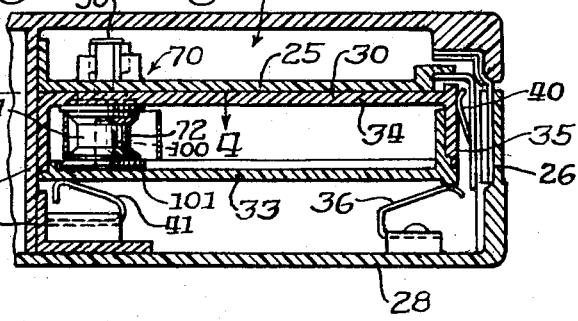
FIG. 3 is an enlarged cross-sectional view of the camera system taken along the line 3—3 in FIG. 1.

The camera system of this invention is generally indicated in FIG. 1 by the reference numeral 10, and includes a motion picture camera 20. A suitable lens system 21 defines an optical axis 22, and a suitable exposure aperture 23 is arranged in optical alignment with the axis 22. In addition, the camera 20 includes a straight interior front wall 24; a substantially flat sidewall 25; and a rear wall 26 which together define a film chamber 27 of predetermined dimensions. As seen in FIG. 3, a hinged door 28 is provided on the camera 20 to allow access to the film chamber 27 for loading and unloading film into the camera. Suitable latching means (not shown) are provided to releasably lock the door 28 closed.

Figure 4:
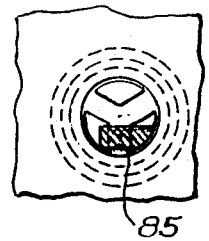
FIG. 4 is a cross-sectional view of the film snubber and snubber locking means incorporated in the camera system, as viewed along the line 4—4 in FIG. 3.

The camera system 10 in accordance with this invention also includes a film cassette 30 for storing and controlling the movement of a roll of motion picture film 50. The dimensions of the cassette 30 and the film chamber 27 are coordinated so that the cassette fits snuggly within the chamber 27, as illustrated in FIGS. 1 and 4. More specifically, the cassette 30 includes a straight front wall 31 which is shaped to fit flush against the front wall 24 of the film chamber 27. A film gate 32 is provided in the cassette front wall 31 in optical alignment with the exposure aperture 23. A standard film shuttle drive (not shown) is also provided on the camera 20. The shuttle drive operates to engage the film 50 in the cassette 30 and incrementally drive segments of the film 50 into the film gate 32. The shuttle drive also permits the film 50 to remain motionless in the film gate 32 when the camera shutter (not shown) operates to expose the film to the light gathered by lens 21. A rear wall 35 on the cassette is arranged to be substantially parallel to the front wall 32. The film gate 32 also includes film guides and biased side pressure fingers (not shown) which guide the film and assist in holding the film substantially motionless during exposure.

In addition, the cassette 30 includes parallel sidewalls 33 and 34. The sidewall 34 is shaped to contact the sidewall 25 of the film chamber 27 provided on the camera 20. The other sidewall 33 is dimensioned to permit the camera door 28 to close after the cassette 30 is inserted in the camera 20. The side and front walls of the cassette 30 and the film chamber 27 thereby cooperate to station the cassette 30 in a selected position within the film chamber 27 with the film gate 32 aligned with the aperture 23.

The camera 20 further includes positioning means to assure that the cassette 30 is maintained in the desired position in the film chamber 27. In this connection, the rear portion of the film chamber 27 includes a pair of spaced biasing springs 40. As indicated in FIGS. 1 and 3, the springs 40 engage with the rear wall 35 of the cassette and urge the cassette forward to engage the cassette front wall 31 with the front wall 24 of the film chamber 27. The camera 20 also includes a pair of side biasing springs 41. As shown in FIGS. 1 and 3, the springs 41 are positioned to engage the sidewall 33 of the cassette 30 and urge the opposite cassette sidewall 34 into engagement with the camera sidewall 25. In addition, to help secure the cassette film gate 32 in alignment with the exposure aperture 23, the springs 41 are spaced above and below the optical axis 22 of the camera. The cassette 30 therefore will be held against the camera front wall 24 and the sidewall 25 after it is inserted in the chamber 27. Furthermore, the rear portion of the cassette 30 is urged against the camera sidewall 25 by means of a side spring 36 provided on the camera door 28. The spring 36 engages the cassette 30 when the door 28 is closed after the cassette is inserted within the film chamber 27. The height of the cassette 30 is selected so that the vertical orientation of the cassette in the chamber 27 is within a tolerance which permits the film shuttle drive to readily engage the perforations in the film at the film gate 32.

The film cassette 30 also includes means for controlling the movement of the roll of film 50. As seen in FIG. 1, the cassette 30 includes a film supply reel 60 positioned for rotation upon a shaft 61. A pair of idler guide rollers 62 and 63 control the feeding of the film 50 from the supply reel 60 to the film gate 32. The film 50 is threaded through the gate 32 to a take-up spool 64 which is rotatably mounted on a shaft 65. The camera 20 is provided with a drive motor (not shown) for rotating the take-up drive shaft 65 and the take-up spool 64 continuously when the camera 10 is operated. The camera 20 is provided with a suitable slip clutch means (not shown) for engaging with the shaft 65 as the cassette 30 is positioned within the film chamber 27. The clutch operates in the conventional manner to couple the take-up drive shaft 65 to the camera drive motor.

As is well known by those skilled in the art, the take-up spool 64 is driven so as to tend to pull film from the shuttle and the exposure aperture of the camera. The shuttle moves the film 50, frame by frame, into the film gate areas, where the frame is exposed to the light gathered by the camera lens 21. After the film frames are exposed, the shuttle advances the exposed film out of the film gate area and permits that film to be wound onto the take-up spool 64. The drive motor causes the shaft 65 to exert a continuous rotational force to the take-up spool 64 as the camera 20 is operated. The take-up spool 64 will thereby exert a continuous but controlled pulling force on the film 50 which tends to pull the film 50 away from the film gate area 44. If such film movement occurred as the frames of the film 50 were being exposed, it would severely affect the quality of the resultant image.

To avoid such undesirable film movement, the camera system 10 in accordance with this invention is provided with a lockable film snubber mechanism 70. The function of the snubber mechanism 70 is to apply a drag or snubbing force to the film 50 of sufficient magnitude to cause the clutch in the take-up spool drive to slip. When the clutch slips, the drive force pulling the film onto the take-up spool 64 is temporarily removed, and the film in the film gate 32 is isolated from the influence of the take-up reel 64. Hence, a film frame in the gate 32 can be retained stationary during exposure without being influenced by the tendency of the take-up spool 64 to pull film from the gate 32.

As indicated in FIG. 1, the snubber mechanism 70 is located in the cassette 30 between the film gate 32 and the take-up reel 64. The mechanism 70 includes a snubber spool 71 having a friction surface 72 which is made from a material such as rubber or the like having a high co-efficient of friction but capable of engaging the film without inflicting scratches or the like. The snubber spool 71 is positioned to engage with the film advancing from the film gate 32 to the take-up spool 64. If the snubber spool 71 is restrained from rotation, the engagement between the film 50 and the spool surface 72 will present a frictional drag on the film which will cause slippage of the clutch in the motor drive for the take-up spool 64. The film restrained in the gate 32 during exposure is thereby isolated from the pull caused by the take up spool 64. After exposure, the camera shuttle drive advances the exposed film from the film gate 32 and thereby forms a film loop below the gate which lowers the film out of engagement with the snubber spool 71. Because the length of film forming the loop is not restrained, the clutch is enabled to drive the take-up spool 64. Hence, a length of the exposed film comparable to the film in the loop will be wound onto the take-up spool 64. Although an indeterminate length of film may be wound onto the spool, the length is limited, since after the loop is withdrawn, the film tightens frictionally against the non-rotatable snubber spool 64, causing the slip torque of the drive system clutch to be overcome until another length of film forms a loop.

Figure 2:
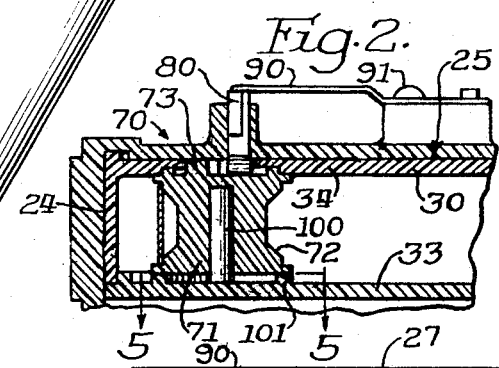
FIG. 2 is an enlarged partial cross-sectional view of the camera system taken along the line 2—2 in FIG. 1.
Figure 7:
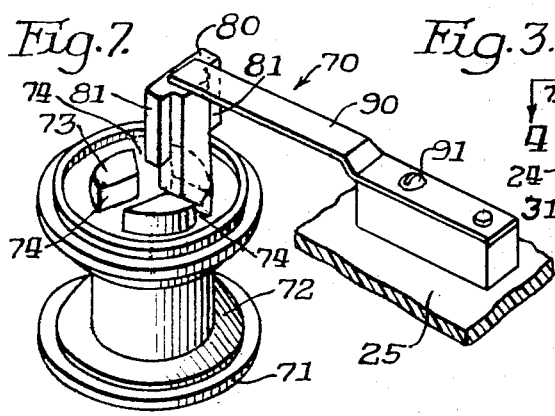
FIG. 7 is a perspective view of the film snubber and locking means shown in an engaged relationship.

In order to make the cassette 30 adaptable for use in an integrated system which exposes, develops and projects the film 50, it is necessary that the film be capable of moving in both directions within the cassette. Accordingly, the snubber mechanism 70 must be releasably lockable so that the cassette 30 is adaptable for use in various operations after the film is exposed in the camera 20. To accomplish this arrangement, the snubber spool 71 is mounted within the cassette 30 with one end thereof defining a locking portion 73 which projects through the sidewall 34 of the cassette. The locking portion 73 is provided with a series of locking recesses 74. As seen in FIG. 2, the locking portion 73 is preferably dimensioned to be flush with or recessed in the cassette sidewall 34 so as not to interfere with the positioning of the cassette 30 against the camera sidewall 25. In the preferred design, the locking recesses are Y-shaped in configuration, as indicated in FIGS. 4 and 7. The Y-shaped configuration provides three grooves equally spaced by the 120° which converge at the axis of the spool 71. The recesses 74 hence can be quickly engaged to lock the snubber reel 71 against rotation when the cassette 30 is placed in the camera film chamber 27.

Figure 6:
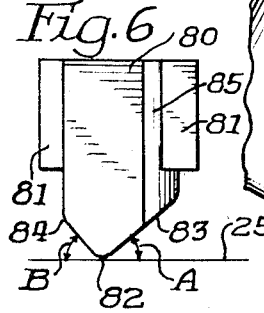
FIG. 6 is a removed plan view of the snubber locking means provided in the camera system.

As seen in FIGS. 2, 6 and 7, the camera system 10 also includes a snubber locking means such as a pin 80. The pin 80 is retained in the sidewall 25 of the camera 20, at a location which permits the pin 80 to engage with the snubber locking recesses 74 as the cassette 30 is inserted within the film chamber 27. As seen in FIGS. 2 and 7, the pin 80 includes splines 81 which guide the movement of the pin by engaging with compatible slots provided in the camera sidewall 25.

The pin 80 is spring-biased inwardly toward the interior of the film chamber 27 by means of a leaf-spring 90. The one end of the spring 90 is anchored to the camera sidewalls 25 by a screw 91 or other suitable fasteners. The free end of the spring 90 engages the pin 80 so that the biasing force urges the pin toward the interior of the film chamber 27. By this arrangement, during insertion of the cassette 30 into the film chamber 27, the cassette engages with and retracts the locking pin 80. Then, after the cassette is positioned in the chamber 27, the spring 90 urges the pin into engagement with the locking recesses 74 of the snubber spool 71. The pin 80 thereby releasably locks the snubber spool 71 from rotation.

As seen in FIG. 6, the forward portion of the pin 80, projecting into the film chamber 27, is beveled to define a camming point 82. In the preferred arrangement, the point 82 is radially offset from the rotational axis of the snubber reel 71 when the cassette is positioned within the film chamber 27. The inward movement of the pin 80 induced by the spring 90 thus engages the camming point 82 with the snubber reel 71 within one of the three converging locking recesses 74.

As further seen in FIG. 6, the beveled point 82 on the locking pin 80 defines a pair of cam surfaces 83 and 84. The cam surface 83 is an entrance cam surface that is engaged by the front wall 31 of the cassette 30 as the cassette is inserted into the camera film chamber 27. The cam surface 84 is an exit cam surface that engages the cassette front wall 31 as the cassette is removed from the chamber 27. In the preferred arrangement, the point 82 is offset from the axial center of the pin 80 to provide the entrance cam surface 83 with a more substantial length than the exit cam surface 84. The cam surface 83 is further provided with a relatively small cam angle A of about 40° from the camera sidewall 25. The cam angle A in the range of 40° permits the cam surface 83 to act as a shallow inclined plane. Such an arrangement diminishes the wedging angle of the cam surface 83 and thereby increases the mechanical advantage of the cam surface 83. The pin 80 hence can be retracted with ease as the cassette 30 is inserted into the camera film chamber 27. In the same regard, it has been found that a cam angle B of about 50 degrees from the surface of the camera sidewall 25 is preferred for the exit cam surface 84. The cam angle B can be greater than the angle A because the cassette 30 is raised and inclined with respect to the camera sidewall 25 as the cassette is being removed from the camera 20. Thus, it has been found that less force is required to retract the pin 80 when the cassette is removed than is required when the cassette is being inserted in the camera 20. Hence, in this preferred embodiment, the mechanical advantage of the entrance cam surface 83 is greater than the mechanical advantage of the exit cam surface 84.

Figure 5:
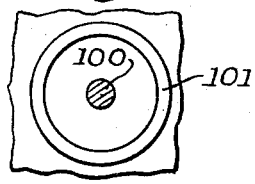
FIG. 5 is a cross-sectional view of a friction braking means provided for the snubber in the cassette, as viewed along the line 5—5 in FIG. 2.

The locking mechanism 70 in accordance with this invention also includes friction braking means to assure that the snubber spool 71 does not rotate when the cassette 30 is stationed in the camera 20. Thus, as seen in FIGS. 2 and 5 the interior wall 33 of the cassette includes a concentric axle 100 and an annular braking surface 101. The snubber spool 71 is rotatably mounted on the axle 100, as seen in FIG. 2. Moreover, the diameter of the annular braking surface 101 is selected so that the surface 101 engages with the outer peripheral portion of the adjacent end of the spool 71. This arrangement maximizes the braking moment arm of the system by providing a substantially large diameter for the braking surface 101. The braking surface 101 hence applies a substantial frictional braking force to the snubber spool 71 which cooperates with the functioning of the locking pin 80 to retain the spool 71 locked when the cassette 30 is in position within the camera 20. As seen in FIG. 2, the force of the spring 90 functions further to urge the spool 71 against the braking surface 101, and thereby enhances the braking moment of the surface 101.

The operation of the motion picture camera system 10 is apparent from the foregoing description of an illustrative embodiment thereof. Before the system 10 is used, the film 50 is wound about the supply spool 60 within the cassette 30. The cassette 30 can be inserted within the film chamber 27 of the camera through the opened door 28. During such an operation, the front edge 31 of the cassette is forced forward in the film chamber 27 into abutment with the front wall 24 of the camera. The pair of springs 41 guide the positioning of the cassette 30, and urge the cassette inwardly against the camera side wall 25. The insertion of the cassette 30 into the camera is completed by pressing the rear edge 35 of the cassette inwardly, against the force of the positioning springs 40, until the sidewall 34 of the cassette is flush against the camera sidewall 25. The vertical positioning of the cassette 30 in the chamber 27 is controlled by controlling the height of the cassette with respect to the height of the film chamber 27. The insertion of the cassette in the camera is completed by closing the access door 28 and engaging the rear edge 35 of the cassette with the positioning spring 36 mounted on the door.

The insertion of the cassette 30 in the above-described manner also activates the snubber locking mechanism 70. The front edge 31 of the cassette engages with the entrance cam surface 83 on the pin 80, and temporarily depresses the pin 80— when the cassette becomes properly positioned in the camera, such as shown in FIG. 2, the force of the spring 90 urges the locking pin 80 inwardly into engagement with one of the three locking recesses 74. As seen in FIGS. 4 and 6, the edge of the locking pin 80 adjacent the entrance cam surface 83 has a bevelled edge 85. The bevelled edge 85 provides the pin 80 with clearance so that the pin will clear the cassette sidewall 34 and engage with the snubber locking recesses 74. The biasing force of the spring 90 urges the spool 71 into frictional engagement with the braking surface 101. The locking pin 80 and the braking surface 101 thereby cooperate to lock the snubber spool 71 from rotation when the cassette is properly positioned within the camera 20.

When the camera is activated, the take-up spool 64 is tendency-driven in a clockwise direction, as shown in FIG. 1, to exert a slight pulling force on the film 50. Simultaneously the camera shuttle drive operates against the film 50 in the film gate 32 to incrementally advance the film 50 into the film gate for exposure. Since the snubber spool 71 is locked against rotation, the surface 72 of the spool applies a frictional drag to the film 50 which overrides the slip clutch provided in the drive for the take-up spool 64. Hence, the locked snubber spool 71 isolates the film in the gate 32 from the driving force of the take-up spool 64, so that the film is not moved as it is being exposed.

Under normal operation of the camera system 10, the camera 20 will be activated until a substantial portion of the film 50 is exposed by being driven from the supply reel 60 to the take-up reel 64. Normally, the end of the film remains attached to the supply reel 60. The cassette 30 then can be removed from the camera 20 upon opening the access door 28. As the cassette moves out of the film chamber 27, the locking portion 73 of the snubber spool 71 will be lifted away from the locking pin 80. Further, the motion of the cassette 30 will engage the cassette sidewall 34 with the cam surface 84 and thereby retract the locking pin 80. The removal of the cassette 30 from the camera 20 thereby releases the locking pin 80 from the snubber spool 71 so that the spool is free to rotate in either direction about the axle 100. The cassette 30 is thus prepared for use in a processor and/or viewer unit wherein the film 50 is selectively driven in both directions about the freely rotatable snubber spool 71 to perform film development and rewinding functions. After the film 50 is developed, the snubber spool 71 can be locked from rotation within the processor/viewer. The spool 71 will thereby operate as a film snubber in the above-described manner during the projection made of operation for the processor/viewer.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention.

What is claimed is:

1. A film-handling system comprising:
   a film cassette having spaced walls for housing a supply of film including a film gate portion and film take-up means;
   a film-handling apparatus having a film chamber for receiving said cassette and including a light aperture;
   positioning means within said film chamber engageable with said cassette to maintain said film gate aligned with said aperture during the operation of said apparatus;
   film shuttle means for incrementally positioning segments of film in said gate to align the film with said aperture;
   drive means for rotating said take-up means to accumulate said film onto said take-up means;
   rotatable film snubbing means mounted for rotation about a selected axis within said cassette between said film gate and take-up means and being engageable with said film segments advancing to said take-up means and further including a locking portion on one end of said snubbing means accessible from the exterior of said cassette;
   positive locking means provided on said apparatus and rigidly engageable with said locking portion of said snubbing means within said film chamber to firmly and positively lock said snubbing means from rotation within said cassette so that said locked snubbing means engages said advancing film segments and isolates the film segments at said gate from the film-moving force of said drive means during the operation of said apparatus;
   means biasing said locking means inwardly into said film chamber; and
   braking means axially aligned with said film snubbing means and arranged to frictionally retard the rotation of said snubbing means as said snubbing means is urged inwardly by the force of said biasing means, said braking means comprising an arcuate friction surface spaced adjacent the periphery of said snubbing means and having a substantial surface area so that the frictional force of said braking means creates a substantial braking moment which resists the rotation of said snubbing means within said cassette during the operation of said apparatus.

2. The system in accordance with claim 1 wherein said braking means comprises a continuous circular friction surface having a substantial diameter and provided between said snubbing means and one of said cassette walls.

3. In a motion picture camera system including a film cassette for housing a supply of motion picture film and having a film gate portion and film take-up means, said cassette further including rotatable film snubbing means mounted for rotation about a selected axis within said cassette between said film gate and take-up means, with said snubbing means being engageable with film segments advancing within said cassette to said take-up means, the improvement comprising:
   a motion picture camera having a film chamber for receiving the cassette and including an exposure aperture for exposing the film in said cassette;

positioning means within said film chamber engageable with said cassette to maintain said film gate aligned with said exposure aperture during operation of said camera;

film shuttle means for incrementally positioning segments of film in said gate to expose the film through said aperture;

drive means for rotating said take-up means to accumulate the exposed film onto the take-up means within the cassette;

a locking portion comprising a recess provided in one end of said snubbing means and arranged to be accessible from the exterior of said cassette; and retractable locking means mounted on said camera and biased inwardly into said film chamber and further having a forward portion arranged to be received within said recess as said cassette is positioned within said film chamber to lock said snubber from rotation within said cassette so that said locked snubbing means engages said advancing film segments and substantially isolates the film segments at said gate from the film-moving force of said drive means during the operation of said camera;

said forward portion of said locking means defining converging entry and exit cam surfaces which are engageable with said cassette to retract said locking means as said cassette is transversely moved with respect to said locking means upon entry of said cassette into and exit of said cassette from said film chamber, respectively.

4. The motion picture camera in accordance with claim 3 wherein said entry and exit cam surfaces converge at a locus such that the transverse extent of said entry cam surface exceeds the transverse extent of said exit cam surface and said entry cam surface thereby provides a substantial mechanical advantage which facilitates the entry of said cassette into said film chamber.

5. The motion picture camera in accordance with claim 3 wherein said entry cam surface extends at an angle of about 50° from the axis of said film snubbing means and said exit cam surface extends at an angle of about 40° from said axis with said cassette in place within said camera film chamber.

6. In a film-handling system including a film cassette for housing a supply of film and having a film gate portion and film take-up means, said cassette further including rotatable film snubbing means mounted for rotation about a selected axis within said cassette between said film gate and take-up means, with said snubbing means being engageable with film segments advancing within said cassette to said take-up means, the improvement comprising:

a film-handling apparatus having a film chamber for receiving the cassette and including a light aperture;

film shuttle means for incrementally positioning segments of film in said gate to align the film with said aperture;

drive means for rotating said take-up means to accumulate the film onto the take-up means within the cassette;

a locking portion on one end of said snubbing means and arranged to be accessible from the exterior of said cassette;

positive locking means retractably mounted on said apparatus and biased inwardly into said film chamber, said locking means being rigidly engageable with said locking portion of said snubbing means as said cassette is positioned within said film chamber to firmly and positively lock said snubbing means from rotation within said cassette so that said locked snubbing means engages said advancing film segments and isolates the film segments at said gate from the film-moving force of said drive means during the operation of said apparatus;

means to retract said locking means outwardly as said cassette is moved transversely with respect to said locking means upon entry of said cassette into and exit of said cassette from said film chamber; and positioning means within said film chamber engageable with said cassette to maintain said film gate aligned with said aperture during operation of said apparatus including biasing means for engaging with said cassette and opposing the biasing force of said locking means so that the snubbing means locking operation causes no substantial movement of said cassette within said film chamber.

7. In a film-handling system including a film cassette having spaced walls for housing a supply of film and having a film gate portion and film take-up means, said cassette further including rotatable film snubbing means mounted for rotation about a selected axis within said cassette walls and between said film gate and take-up means, with said snubbing means being engageable with film segments advancing within said cassette to said take-up means, the improvement comprising:

a film-handling apparatus having a film chamber for receiving the cassette and including a light aperture;

positioning means within said film chamber engageable with said cassette to maintain said film gate aligned with said aperture during operation of said apparatus;

film shuttle means for incrementally positioning segments of film in said gate to align the film with said aperture;

drive means for rotating said take-up means to accumulate the film onto the take-up means within the cassette;

a locking portion provided on one end of said snubbing means and projecting outwardly through the adjacent wall of said cassette to be readily accessible from the exterior of said cassette;

a locking recess provided in said locking portion accessible from the exterior of said cassette;

retractable positive locking means provided on said apparatus in alignment with said locking portion within said film chamber, said locking means having a forward portion movable over said projecting locking portion into releasable engagement with said locking recess as said cassette is positioned within said chamber and configured with respect to said recess to positively lock said snubbing means from rotation within said cassette, so that said locked snubbing means engages said advancing film segments and isolates the film segments at said gate from the film-moving force of said drive means during the operation of said apparatus;

entry camming means for retracting said locking means as said cassette is positioned within said film chamber to position said locking means for engagement with said locking recess; and exit camming means for retracting said locking means from said locking recess as said cassette is removed from said film chamber.

8. In a film-handling system including a film cassette having spaced walls for housing a supply of film and having a film gate portion and film take-up means, said cassette further including rotatabe film snubbing means mounted for rotation about a selected axis within said cassette walls and between said film gate and take-up means, with said snubbing means being engageable with film segments advancing within said cassette to said take-up means, the improvement comprising:

a film-handling apparatus having a film chamber including sidewalls for receiving the cassette and a light aperture;

positioning means within said film chamber engageable with said cassette to maintain said film gate aligned with said aperture during operation of said apparatus;

film shuttle means for incrementally positioning segments of film in said gate to align the film with said aperture;

drive means for rotating said take-up means to accumulate the film onto the take-up means within the cassette;

a locking portion provided on one end of said snubbing means and projecting outwardly through the adjacent wall of said cassette to be readily accessible from the exterior of said cassette, said locking portion further being substantially flush with said adjacent cassette wall to permit said cassette to be positioned against one chamber side wall;

a locking recess provided in said locking portion accessible from the exterior of said cassette; and retractable positive locking means mounted within said one chamber sidewall in alignment with said locking portion within said film chamber, said locking means having a forward portion movable over said projecting locking portion into releasable engagement with said locking recess as said cassette is positioned within said chamber and configured with respect to said recess to positively lock said snubbing means from rotation within said cassette, so that said locked snubbing means engages advancing film segments and isolates the film segments at said gate from the film-moving force of said drive means during the operation of said apparatus.

9. In a film-handling system including a film cassette having spaced walls for housing a supply of film and having a film gate portion and film take-up means, said cassette further including rotatable film snubbing means mounted for rotation about a selected axis within said cassette walls and between said film gate and take-up means, with said snubbing means being engageable with film segments advancing within said cassette to said take-up means, the improvement comprising:

a film-handling apparatus having a film chamber for receiving the cassette and including a light aperture;

positioning means within said film chamber engageable with said cassette to maintain said film gate aligned with said aperture during operation of said apparatus;

film shuttle means for incrementally positioning segments of film in said gate to align the film with said aperture;

drive means for rotating said take-up means to accumulate the film onto the take-up means within the cassette;

a locking portion provided on one end of said snubbing means and projecting outwardly through the adjacent wall of said cassette to be readily accessible from the exterior of said cassette;

a locking recess provided in said locking portion accessible from the exterior of said cassette;

retractable positive locking means provided on said apparatus in alignment with said locking portion within said film chamber and configured with respect to said recess to positively lock said snubbing means from rotation within said cassette so that said locked snubbing means engages said advancing film segments and isolates the film segments at said gate from the film-moving force of said drive means during the operation of said apparatus;

means biasing said locking means inwardly into said film chamber; and retracting means responsive to the movement of said cassette with respect to said chamber to oppose the inward force of said biasing means with said retracting means operating to retract said locking means outwardly as said cassette is positioned within said chamber to move said locking means over said projecting locking portion for releasable engagement with said locking recess, and said retracting means further operating to retract said locking means outwardly as said cassette is moved from said chamber to release said locking means from engagement with said locking recess and facilitate the removal of said cassette from said apparatus.

10. The film-handling system in accordance with claim 9 wherein said retracting means comprises a forward portion of said locking means engageable with a portion of said cassette and said projecting locking portion to retract said locking means in response to movement of said cassette with respect to said film chamber.

11. The system in accordance with claim 9 wherein said locking means is slidably mounted in said camera by means of guide members which permit said locking means to slide inwardly into said film chamber and preclude said locking means from rotating in response to forces applied by said film segments to said rotatable snubbing means.

* * * * *

Disclaimer 3,867,021.—*Arthur C. Mueller*, Niles, and *Kenyon A. Hapke*, Libertyville, Ill. MOTION PICTURE CAMERA SYSTEM. Patent dated Feb. 18, 1975. Disclaimer filed Apr. 1, 1977, by the assignee, *Polaroid Corporation*.

Hereby enters this disclaimer to all claims of said patent.

[*Official Gazette May 24, 1977.*]